US012378734B2

(12) United States Patent
Tang et al.

(10) Patent No.: US 12,378,734 B2
(45) Date of Patent: Aug. 5, 2025

(54) CONTROL METHOD FOR ROAD ROLLER MACHINE, AND ROAD ROLLER MACHINE

(71) Applicant: Hunan Sany Zhongyi Machinery Co., Ltd., Yiyang (CN)

(72) Inventors: Hengning Tang, Yiyang (CN); Gan Jia, Yiyang (CN); Xiangping Hu, Yiyang (CN)

(73) Assignee: Hunan Sany Zhongyi Machinery Co., Ltd., Yiyang (CN)

( * ) Notice: Subject to any disclaimer, the term of this patent is extended or adjusted under 35 U.S.C. 154(b) by 835 days.

(21) Appl. No.: 17/679,473

(22) Filed: Feb. 24, 2022

(65) Prior Publication Data

US 2022/0275591 A1 Sep. 1, 2022

Related U.S. Application Data

(63) Continuation of application No. PCT/CN2021/100946, filed on Jun. 18, 2021.

(30) Foreign Application Priority Data

Jun. 28, 2020 (CN) ......................... 202010596207.5

(51) Int. Cl.
*E01C 19/28* (2006.01)
*B06B 1/18* (2006.01)

(52) U.S. Cl.
CPC ............ *E01C 19/286* (2013.01); *B06B 1/183* (2013.01)

(58) Field of Classification Search
CPC .............................. E01C 19/286; B06B 1/183
(Continued)

(56) References Cited

U.S. PATENT DOCUMENTS

| | | | |
|---|---|---|---|
| 8,206,061 | B1 | 6/2012 | Hansen et al. |
| 2009/0126953 | A1 | 5/2009 | Anderegg et al. |

(Continued)

FOREIGN PATENT DOCUMENTS

| | | | |
|---|---|---|---|
| CN | 201532546 | U | 7/2010 |
| CN | 201952712 | U | 8/2011 |

(Continued)

OTHER PUBLICATIONS

First Office Action issued in counterpart Chinese Patent Application No. 202010596207.5, dated Jun. 22, 2021.

(Continued)

*Primary Examiner* — Raymond W Addie
(74) *Attorney, Agent, or Firm* — Westbridge IP LLC

(57) ABSTRACT

Disclosed are a control method for a road roller machine, and a road roller machine. The control method includes: turning up, in response to a request of starting vibration, a revolving speed of an engine until the revolving speed exceeds a preset revolving speed range and turning down a displacement of a driving pump; starting a vibration pump; judging whether a vibration assembly has completed a vibration start; turning down, after the vibration start is completed, the revolving speed of the engine to be within the preset revolving speed range, turning up the displacement of the driving pump, and turning up a displacement of the vibration pump. The road roller machine includes a main body, an engine, a driving assembly, a driving pump, a vibration pump, a vibration assembly and a controller.

18 Claims, 5 Drawing Sheets

(58) Field of Classification Search
USPC ....................................... 404/84.05–84.5, 117
See application file for complete search history.

(56) References Cited

U.S. PATENT DOCUMENTS

| | | | | |
|---|---|---|---|---|
| 2009/0143952 | A1* | 6/2009 | Chisholm | B60W 10/30 701/99 |
| 2016/0319496 | A1* | 11/2016 | Wiktor | F15B 21/02 |
| 2017/0121917 | A1* | 5/2017 | Frelich | E01C 19/26 |
| 2020/0048845 | A1 | 2/2020 | Darscheid | |

FOREIGN PATENT DOCUMENTS

| | | | | |
|---|---|---|---|---|
| CN | 202323649 | U | 7/2012 | |
| CN | 203021897 | U | 6/2013 | |
| CN | 203320382 | U | 12/2013 | |
| CN | 203320384 | U | 12/2013 | |
| CN | 103898828 | A | 7/2014 | |
| CN | 204000550 | U | 12/2014 | |
| CN | 204239353 | U | 4/2015 | |
| CN | 105626279 | A | 6/2016 | |
| CN | 109183568 | A | 1/2019 | |
| CN | 109778640 | A | 5/2019 | |
| CN | 110258263 | A | 9/2019 | |
| CN | 110453572 | A | 11/2019 | |
| CN | 110578282 | A | 12/2019 | |
| CN | 210420800 | U | 4/2020 | |
| CN | 111749084 | A | 10/2020 | |
| DE | 102018007825 | A1 | 4/2020 | |
| JP | 2008050859 | A | 3/2008 | |
| JP | 2010269286 | A | 12/2010 | |
| JP | 2017128880 | A | 7/2017 | |
| WO | 0201008 | A1 | 1/2002 | |
| WO | 2014029410 | A1 | 2/2014 | |
| WO | 2015130290 | A1 | 9/2015 | |
| WO | WO-2019142551 | A1 * | 7/2019 | B06B 1/16 |

OTHER PUBLICATIONS

International Search Report issued in corresponding PCT Application No. PCT/CN2021/100946, dated Sep. 3, 2021.

Zhang et al., Have a Discussion on the Energy-saving Technology of the Double-drum Vibratory Roller, Construction Machinery Technology and Management, pp. 129-131, Issue 04, 2011, dated Apr. 30, 2011.

* cited by examiner

CONTROL METHOD FOR ROAD ROLLER MACHINE, AND ROAD ROLLER MACHINE

CROSS-REFERENCE TO RELATED APPLICATIONS

The present application is a continuation of International Application No. PCT/CN2021/100946, filed on Jun. 18, 2021, which claims priority to Chinese Patent Application No. 202010596207.5, filed on Jun. 28, 2020. All applications are incorporated herein by reference in their entireties.

TECHNICAL FIELD

Embodiments of the present application relates to the field of construction machinery technologies, in particular to a control method for a road roller machine, and a road roller machine.

BACKGROUND

In the related art, there are usually two ways of vibration start for a road roller.

One way is to use a pump with a small displacement when a vibration wheel starts vibrating, and use a transfer case to increase flow of the pump, thereby avoid overloading. In an energy-saving mode, when the road roller travels without vibration, a handle and a revolving speed of an engine are linked. When the handle is pushed to a maximum speed, the revolving speed of the engine reaches a maximum revolving speed set in the energy-saving mode. When the road roller vibrates, the revolving speed of the engine rises to the maximum revolving speed set in the energy-saving mode, while a displacement of a driving pump changes to keep the speed constant, so far the revolving speed of the engine fails to change.

The other way is to keep the revolving speed of the engine unchanged when an idle speed reaches a rated speed, rise the revolving speed of the engine to the rated speed when the handle is moved, and return the revolving speed of the engine to the idle speed when the handle returns to a neutral position. Therefore, running time of the engine at a high revolving speed and fuel consumption are reduced.

However, the two ways have the following problems.

1) A problem of how to realize energy-saving control for a road roller with a large engine load rate;

2) A problem of how to start vibration of the vibration wheel when the engine is at a low speed.

SUMMARY

A control method for a road roller machine is provided by embodiments of a first aspect of the present application.

A road roller machine is provided by embodiments of a second aspect of the present application.

According to an embodiment of the first aspect of the present application, the control method for the road roller machine is provided by the present application. The road roller machine includes an engine, a driving pump, a vibration pump and a vibration assembly. The driving pump and the vibration pump are powered by the engine. The control method includes: turning up, in response to a request of starting vibration, a revolving speed of the engine until the revolving speed exceeds a preset revolving speed range and turning down a displacement of the driving pump; starting the vibration pump; judging whether the vibration assembly has completed a vibration start; and turning down, after the vibration assembly completes the vibration start, the revolving speed of the engine to be within the preset revolving speed range, turning up the displacement of the driving pump, and turning up a displacement of the vibration pump.

The control method for the road roller machine according to the embodiments of the present application is applied to the road roller machine. The road roller machine includes the engine, the driving pump, the vibration pump and the vibration assembly. The vibration pump and the driving pump are driven by the engine. The vibration pump is configured to drive the vibration assembly to vibrate. The driving pump is configured to drive the road roller machine to travel. When the road roller machine receives the request of starting vibration, the revolving speed of the engine is turned up until the revolving speed of the engine exceeds the preset revolving speed range, that is, reaches a high value. In addition, the displacement of the driving pump is turned down, and the vibration pump is started. Since the revolving speed of the engine reaches a value exceeding the preset revolving speed range, a vibration assembly with a large load may be driven, thereby realizing a start of a vibration function at a low revolving speed of the engine, and maximizing a performance of the engine. Furthermore, after the vibration start is completed, the revolving speed of the engine is turned down to be within the preset revolving speed range, the displacement of the driving pump is turned up, and the displacement of the vibration pump is turned up. Since the revolving speed of the engine and the displacement of the vibration pump are related to a vibration frequency of the vibration assembly, by turning down the revolving speed of the engine and turning up the displacement of the vibration pump, an impact of a reduction of the revolving speed of the engine on the vibration frequency of the vibration assembly may be reduced, thereby ensuring stability of the vibration frequency. In addition, since the revolving speed of the engine and the displacement of the driving pump are related to the driving speed of the road roller machine, by turning up the revolving speed of the engine and turning down the displacement of the driving pump, an impact of an increase of the revolving speed of the engine on the driving speed of the road roller machine may be reduced, thereby facilitating the road roller machine to start the vibration assembly during a driving process of the road roller machine.

Since the revolving speed of the engine is turned up after the road roller machine receives the request of starting vibration, the engine may maintain a operation state with a low revolving speed before the road roller machine receives the request of starting vibration, thereby realizing a vibration start of the vibration assembly at the low revolving speed of the engine. Furthermore, after the vibration start is completed, the revolving speed of the engine is turned down to be within the preset revolving speed range, which is more conducive for the road roller machine to achieve energy saving and environmental protection.

In addition, the control method for the road roller machine according to the above embodiments of the present application may also include the following additional technical features.

Furthermore, based on the above technical solutions, before the turning up, in response to the request of starting vibration, the revolving speed of the engine until the revolving speed exceeds the preset revolving speed range and turning down the displacement of the driving pump, the control method further includes: controlling the revolving speed of the engine to be within the preset revolving speed range.

In the technical solutions, the revolving speed of the engine is controlled to be within the preset revolving speed range during a driving process of the road roller machine without starting the vibration assembly, so that the revolving speed of the engine of the road roller machine may be controlled to be within an energy-saving revolving speed range, which is more conducive for the road roller machine to achieve the energy saving and the environmental protection.

Furthermore, based on any one of the above technical solutions, the turning up, in response to the request of starting vibration, the revolving speed of the engine and turning down the displacement of the driving pump includes: turning up, in response to the request of starting vibration, the revolving speed of the engine to a preset revolving speed value, and turning down the displacement of the driving pump to a first preset displacement value, so that the driving speed of the road roller machine is constant. The preset revolving speed value is higher than an upper limit of the preset revolving speed range.

In the technical solutions, after the request of starting vibration is received, the revolving speed of the engine is turned up to the preset revolving speed value, and the displacement of the driving pump is turned down to the first preset displacement value. Therefore, a constant point is provided for the revolving speed of the engine and the displacement of the driving pump, thereby more effectively controlling the driving speed of the road roller machine to keep the driving speed of the road roller machine constant. In addition, a stable power foundation may be provided for the vibration start of the vibration assembly.

Furthermore, based on any one of the above technical solutions, the control method further includes: detecting the driving speed of the road roller machine, determining a first corresponding relationship between the revolving speed of the engine and the displacement of the driving pump according to the driving speed of the road roller machine, and determining the first preset displacement value according to the preset revolving speed value and the first corresponding relationship.

In the technical solutions, firstly the driving speed of the road roller machine is obtained, and the corresponding relationship between the revolving speed of the engine and the displacement of the driving pump at the driving speed is established. Therefore, when the revolving speed of the engine reaches the preset revolving speed value, the displacement of the driving pump is also adjusted to the first preset displacement value corresponding to the preset revolving speed value, so as to keep the driving speed of the road roller machine constant during a whole process of starting vibration.

Furthermore, based on any one of the above technical solutions, the judging whether the vibration assembly has completed the vibration start includes: judging whether the vibration frequency of the vibration assembly has reached a preset frequency. When the vibration frequency of the vibration assembly reaches the preset frequency, the vibration assembly is deemed to have completed the vibration start.

In the technical solutions, whether the vibration assembly has completed the vibration start is determined by judging whether the vibration frequency of the vibration assembly has reached the preset frequency. When the vibration frequency of the vibration assembly reaches the preset frequency, it means that the vibration assembly has completed the vibration start. In addition, a way of judging whether the vibration assembly has completed the vibration start by detecting the vibration frequency is simple, clear, and highly accurate.

Furthermore, based on any one of the above technical solutions, before the turning up, in response to the request of starting vibration, the revolving speed of the engine and turning down the displacement of the driving pump, the control method further includes: determining, in response to a setting instruction of the vibration frequency, the preset frequency.

In the technical solutions, before the request of starting vibration is received, the setting instruction of the vibration frequency is received, and the preset frequency is determined according to the vibration frequency. Specifically, the setting instruction of the vibration frequency may be set by default or reset.

Furthermore, based on any one of the above technical solutions, the starting the vibration pump specifically includes: determining a second corresponding relationship between the revolving speed of the engine and the displacement of the vibration pump according to the preset frequency, and determining a second preset displacement value according to the preset revolving speed value and the second corresponding relationship, so that the vibration pump is started at the second preset displacement value.

In the technical solutions, firstly the second corresponding relationship between the revolving speed of the engine and the displacement of the vibration pump is established according to the preset frequency. After the revolving speed of the engine reaches the preset revolving speed value, the vibration pump is started at the second preset displacement value corresponding to the preset revolving speed value at the preset frequency, thereby providing sufficient power for starting vibration and ensuring a speed of starting vibration.

Furthermore, based on any one of the above technical solutions, the turning down, after the vibration assembly completes the vibration start, the revolving speed of the engine, turning up the displacement of the driving pump, and turning up the displacement of the vibration pump specifically includes: turning down, after the vibration assembly completes the vibration start, the revolving speed of the engine to a revolving speed before responding to the request of starting vibration, turning up the displacement of the driving pump to a displacement before responding to the request of starting vibration, turning up the displacement of the vibration pump to a third preset displacement value.

In the technical solutions, after the vibration assembly completes the vibration start, the revolving speed of the engine is adjusted back to the speed before responding to the request of starting vibration, and the displacement of the driving pump is adjusted back to the displacement before responding to the request of starting vibration. Therefore, the driving process of the road roller machine is ensured to be stable, and the energy saving of the road roller machine is ensured. Further, the displacement of the vibration pump is also turned up to the third preset displacement value, thereby ensuring stability of the vibration frequency of the vibration assembly.

Furthermore, based on any one of the above technical solutions, an adjustment amount of the revolving speed of the engine is inversely proportional to an adjustment amount of the displacement of the driving pump, so that the driving speed of the road roller machine is constant.

In the technical solutions, since the driving speed of the road roller machine is positively related to the revolving speed of the engine and the displacement of the driving pump, by setting the adjustment amount of the revolving speed of the engine and the adjustment amount of the displacement of the driving pump in an inverse proportional relationship, the corresponding relationship between the revolving speed of the engine and the displacement of the driving pump may be calculated under a condition that the driving speed of the road roller machine is constant. Further, the engine and the driving pump may be controlled according to the relationship, thereby ensuring the driving speed of the road roller machine constant, and ensuring the start of the vibration assembly during the driving process of the road roller machine.

According to an embodiment of the second aspect according to the present application, the road roller machine provided by the present application includes: a main body; an engine disposed on the main body; a driving assembly disposed on the main body; a driving pump disposed on the main body and configured to drive the driving assembly; a vibration assembly disposed on the main body; a vibration pump disposed on the main body and configured to drive the vibration assembly; and a controller electrically connected with the engine, the driving pump and the vibration pump. The controller is configured to execute the control method for the road roller machine according to any one of the above technical solutions.

The road roller machine provided by the present application includes: the main body, the engine, the driving assembly, the driving pump, the vibration assembly and the vibration pump. The engine is configured to provide power for the driving pump and the vibration pump. The driving pump is configured to drive the driving assembly, so as to drive the road roller machine to travel. The vibration pump is configured to drive the vibration assembly. The controller is configured to execute the control method for the road roller machine according to any one of the above technical solutions. Therefore, the road roller machine provided by the present application has beneficial effects of the control method for the road roller machine provided by any one of the above technical solutions, which will not be described one by one here.

Furthermore, based on the above technical solutions, the road roller machine further includes: a frequency detection assembly disposed on the main body, the frequency detection assembly being configured to detect a vibration frequency of the vibration assembly and being electrically connected with the controller; and a speed detection assembly disposed on the main body, the speed detection assembly being configured to detect a speed of the road roller machine and being electrically connected with the controller.

In the technical solutions, the road roller machine further includes the frequency detection assembly. The frequency detection assembly is configured to detect the vibration frequency of the vibration assembly, so as to determine whether the vibration start has completed. The road roller machine further includes the speed detection assembly. The speed detection assembly is configured to detect the driving speed of the road roller machine, so as to control a displacement of the driving pump according to the driving speed of the road roller machine and a revolving speed of the engine, thereby ensuring the constant driving speed of the road roller machine.

Additional aspects and advantages of the present application will become apparent in the following description, or may be learned according to practice of the present application.

BRIEF DESCRIPTION OF DRAWINGS

The above and/or additional aspects and advantages of the present application will become apparent and easy to understand from the following description of embodiments in combination with accompanying drawings.

DETAILED DESCRIPTION OF THE EMBODIMENTS

In order to more clearly understand the above objects, features and advantages of the present application, the present application will be further described in detail below in combination with accompanying drawings and specific embodiments. It may be noted that the embodiments of the present application and the features in the embodiments may be combined with each other in a case without conflict.

Numerous specific details are set forth in the following description to facilitate a full understanding of the present application. However, the present application can also be implemented in other ways different from those described herein. Therefore, the protection scope of the present application is not limited by the specific embodiments disclosed below.

The following describes a control method for a road roller machine, and a road roller machine according to some embodiments of the present application with reference to FIG. 1 to FIG. 5.

Embodiment 1

Figure 1:
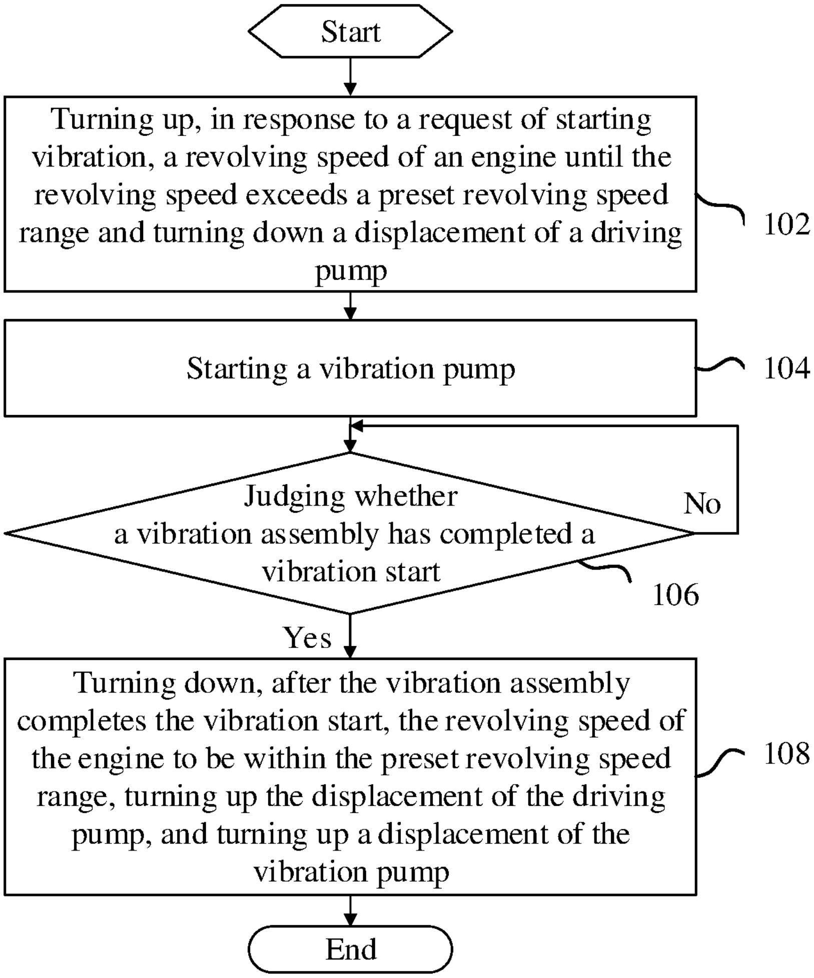
FIG. 1 is a flowchart of a control method for a road roller machine according to a first embodiment of the present application.

FIG. 1 is a flowchart of a control method for a road roller machine according to a first embodiment of the present application.

As shown in FIG. 1, a specific process of the control method for the road roller machine according to the first embodiment of the present application is as follows. For example, the control method is executed by a controller of the road roller machine.

Step 102: turning up, in response to a request of starting vibration, a revolving speed of an engine until the revolving speed exceeds a preset revolving speed range and turning down a displacement of a driving pump.

Step 104: starting a vibration pump.

Step 106: judging whether a vibration assembly has completed a vibration start. If a judgment result is yes, execute Step 108, and if the judgement result is no, return to Step 106 again.

Step 108: turning down, after the vibration assembly completes the vibration start, the revolving speed of the engine to be within the preset revolving speed range, turning up the displacement of the driving pump, and turning up a displacement of the vibration pump.

In the embodiment, if the road roller machine receives the request of starting vibration during a driving process, the revolving speed of the engine is turned up and the displacement of the driving pump is turned down. By turning up the revolving speed of the engine, the vibration assembly of the road roller machine may obtain higher kinetic energy, and the vibration assembly with large load may obtain starting kinetic energy, so as to realize a start of a vibration function at a low revolving speed of the engine. Therefore, a performance of the engine may be brought into full play with maximum efficiency without using a transfer case to increase the revolving speed transmitted from the engine, thereby simplifying a structure of the road roller machine and reducing costs.

However, a driving speed of the road roller machine is determined by a flow rate of a driving motor. The driving motor is supplied with hydraulic power by the driving pump. The flow rate of the driving motor may be regarded as the revolving speed of the engine multiplied by the displacement of the driving pump. Therefore, the revolving speed of the engine and the displacement of the driving pump directly affect the driving speed of the road roller machine. If the revolving speed of the engine is turned up alone, the driving speed of the road roller machine will be greatly increased, and then starting the vibration function will cause danger during a driving progress of the road roller machine. Therefore, the displacement of the driving pump needs to be turned down in the present application, thereby reducing an impact on the driving speed of the road roller machine when the vibration function is started, which is more beneficial for the road roller machine to start the vibration function during driving.

In addition, after the engine completes the vibration start, the revolving speed of the engine is turned down to be within the preset revolving speed range, and then the revolving speed of the engine is adjusted to a preset revolving speed interval. Therefore, energy consumption of the road roller machine may be reduced to achieve a purpose of saving energy. At this time, by turning up the displacement of the driving pump, the impact of a change of the revolving speed of the engine on the driving speed of the road roller machine is reduced again.

Since the revolving speed of the engine and the displacement of the vibration pump are related to a vibration frequency of the vibration assembly, after the revolving speed of the engine is turned down, and the displacement of the vibration pump is turned up, an impact of a reduction of the revolving speed of the engine on the vibration frequency of the vibration assembly may be reduced to ensure stability of the vibration.

Moreover, the control steps of the present application are simple and efficient, and there is no need for accumulator, which is still applicable in environments such as plateaus.

The above description of "during the driving process of the road roller machine" is only used for illustration, and the present application may also be used for driving when the road roller machine is stopped.

Specifically, the preset revolving speed range may be an economic revolving speed range of the road roller machine. The economical revolving speed range refers to a revolving speed range in which an engine of a vehicle is the most fuel efficient. Due to differences in vehicle structure and engine structure, economic revolving speed ranges of different vehicles are different. For example, the economic revolving speed range of some road roller machines ranges from 1700 r/min to 1900 r/min, and the economic revolving speed range of some road roller machines ranges from 1300 r/min to 1500 r/min.

Embodiment 2

Figure 2:
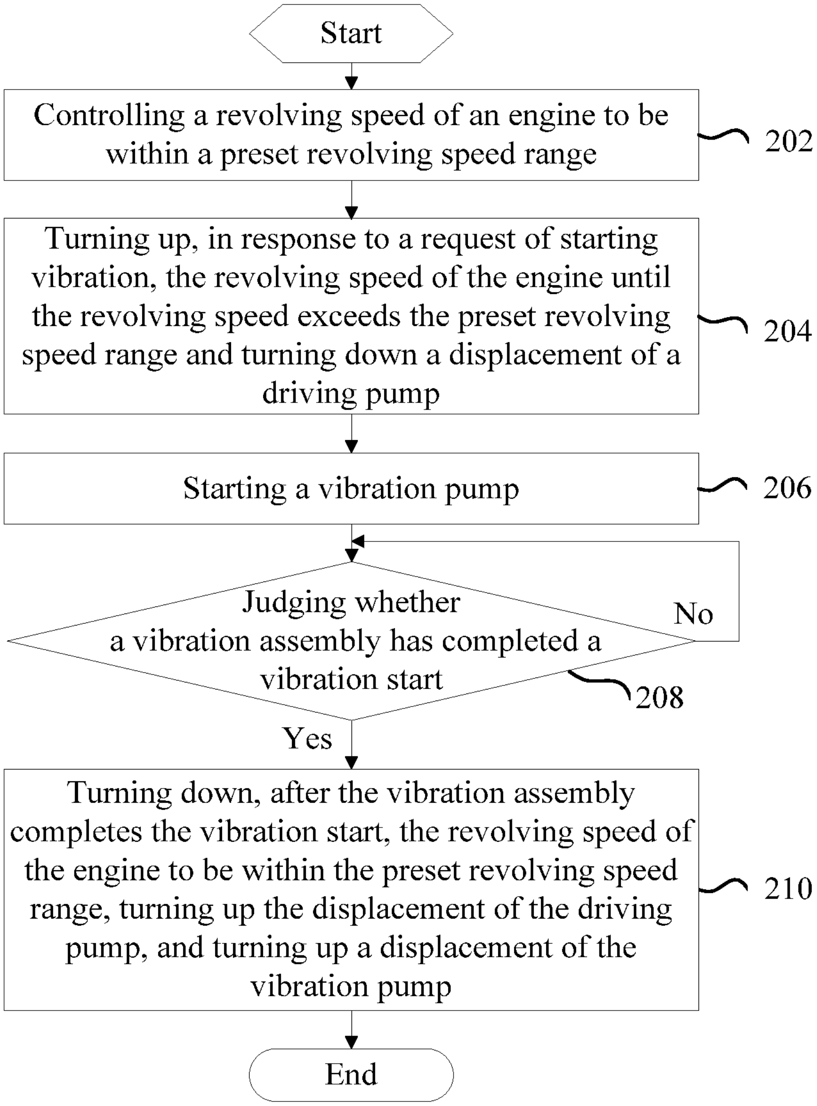
FIG. 2 is a flowchart of a control method for a road roller machine according to a second embodiment of the present application.

FIG. 2 is a flowchart of a control method for a road roller machine according to a second embodiment of the present application.

As shown in FIG. 2, a specific process of the control method for the road roller machine according to the second embodiment of the present application is as follows.

Step 202: controlling a revolving speed of an engine to be within a preset revolving speed range.

Step 204: turning up, in response to a request of starting vibration, the revolving speed of the engine until the revolving speed exceeds the preset revolving speed range and turning down a displacement of a driving pump.

Step 206: starting a vibration pump.

Step 208: judging whether a vibration assembly has completed a vibration start. If a judgment result is yes, execute Step 210, and if the judgement result is no, return to Step 208 again.

Step 210: turning down, after the vibration assembly completes the vibration start, the revolving speed of the engine to be within the preset revolving speed range, turning up the displacement of the driving pump, and turning up a displacement of the vibration pump.

In the embodiment, based on Embodiment 1 mentioned above, before the turning up, in response to the request of starting vibration, the revolving speed of the engine until the revolving speed exceeds the preset revolving speed range and turning down the displacement of the driving pump, the engine is controlled to run at a revolving speed within the preset revolving speed range. Therefore, the revolving speed of the engine is ensured to be within the economic revolving speed range, thereby ensuring an energy-saving effect of the engine during driving.

Embodiment 3

Figure 3:
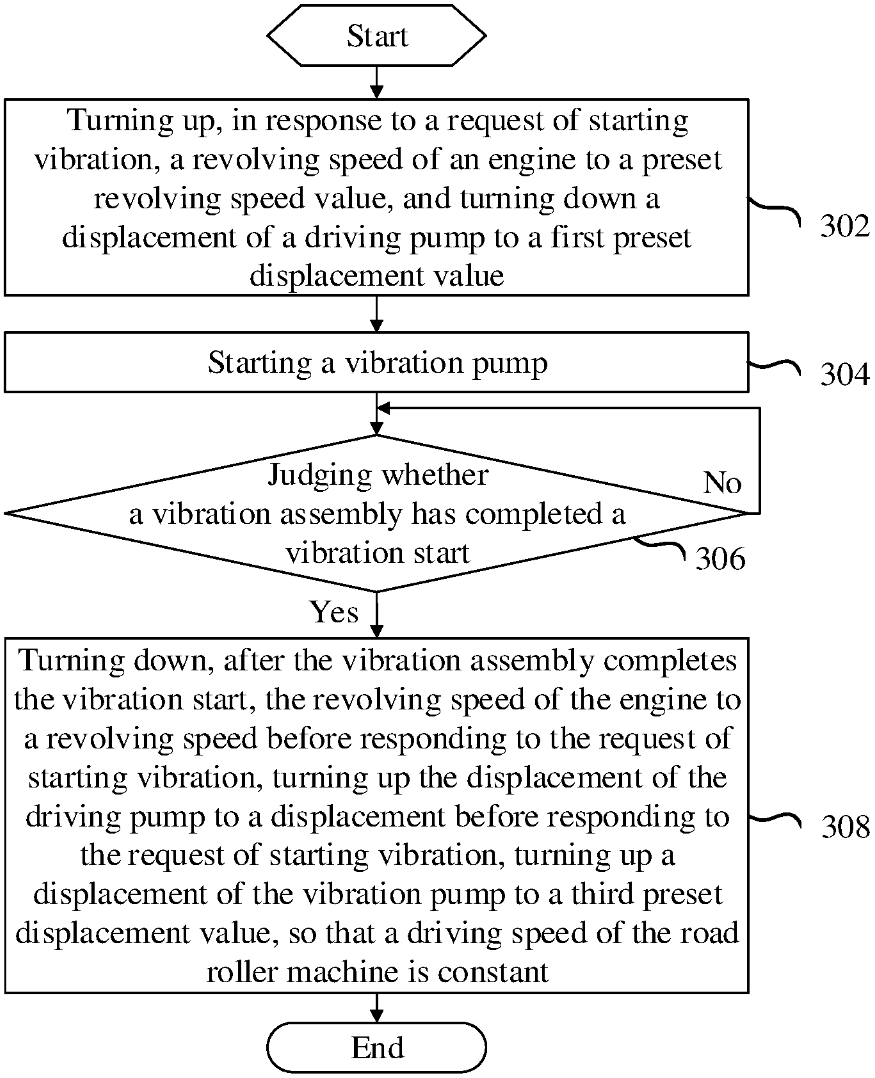
FIG. 3 is a flowchart of a control method for a road roller machine according to a third embodiment of the present application.

FIG. 3 is a flowchart of a control method for a road roller machine according to a third embodiment of the present application.

As shown in FIG. 3, a specific process of the control method for the road roller machine according to the third embodiment of the present application is as follows.

Step 302: turning up, in response to a request of starting vibration, a revolving speed of an engine to a preset revolving speed value, and turning down a displacement of a driving pump to a first preset displacement value.

Step 304: starting a vibration pump.

Step 306: judging whether a vibration assembly has completed a vibration start. If a judgment result is yes, execute Step 308, and if the judgement result is no, return to Step 306 again.

Step 308: turning down, after the vibration assembly completes the vibration start, the revolving speed of the engine to a revolving speed before responding to the request of starting vibration, turning up the displacement of the driving pump to a displacement before responding to the request of starting vibration, turning up a displacement of the vibration pump to a third preset displacement value, so that a driving speed of the road roller machine is constant.

The preset revolving speed value is higher than an upper limit of an economic revolving speed range.

In the embodiment, based on Embodiment 1 or 2, if the request of starting vibration is received, the revolving speed of the engine is turned up to the preset revolving speed value, and the displacement of the driving pump is turned down to the first preset displacement value. By setting the specific preset revolving speed value and the first preset displacement value, the driving speed of the road roller machine may be adjusted in a targeted manner to keep the driving speed of the road roller machine constant, which is beneficial to control of the road roller machine.

Similarly, as for the displacement of the vibration pump, after the vibration start is completed, the displacement of the vibration pump is turned up to the third preset displacement value, so that the vibration assembly may be controlled to operate stably according to a frequency of the vibration assembly.

Embodiment 4

Figure 4:
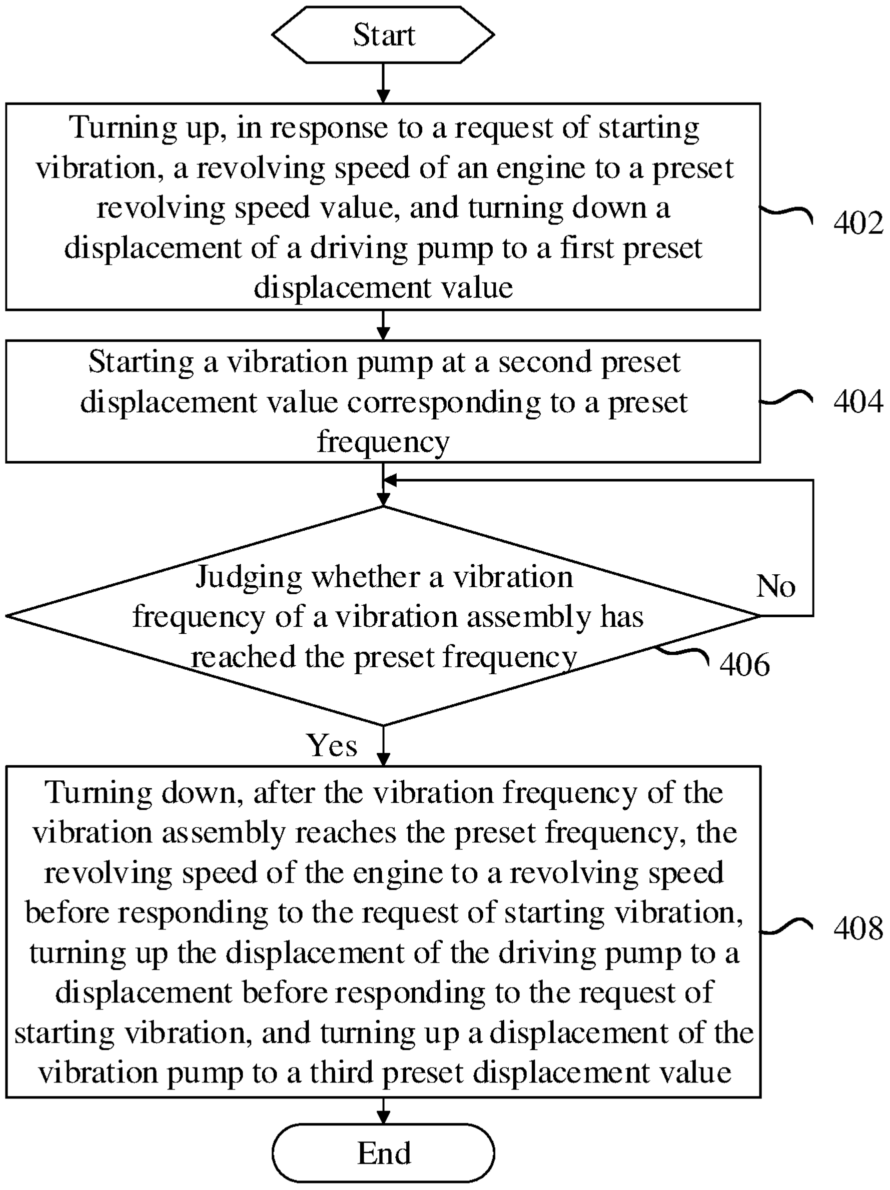
FIG. 4 is a flowchart of a control method for a road roller machine according to a fourth embodiment of the present application.

FIG. 4 is a flowchart of a control method for a road roller machine according to a fourth embodiment of the present application.

As shown in FIG. 4, a specific process of the control method for the road roller machine according to the fourth embodiment of the present application is as follows.

Step 402: turning up, in response to a request of starting vibration, a revolving speed of an engine to a preset revolving speed value, and turning down a displacement of a driving pump to a first preset displacement value.

Step 404: starting a vibration pump at a second preset displacement value corresponding to a preset frequency.

Step 406: judging whether a vibration frequency of a vibration assembly has reached the preset frequency. If a judgment result is yes, execute Step 408, and if the judgement result is no, return to Step 406 again.

Step 408: turning down, after the vibration frequency of the vibration assembly reaches the preset frequency, the revolving speed of the engine to a revolving speed before responding to the request of starting vibration, turning up the displacement of the driving pump to a displacement before responding to the request of starting vibration, and turning up a displacement of the vibration pump to a third preset displacement value.

In the embodiment, based on any one of Embodiments 1 to 3, judging whether the vibration assembly has completed a vibration start is realized by judging whether the vibration frequency of the vibration assembly has reached the preset frequency. Specifically, judging whether the vibration frequency of the vibration assembly has reached the preset frequency may be judging whether the vibration frequency of the vibration assembly continuously maintains the preset frequency within a preset time. The preset time may be 3 seconds, 5 seconds, etc., so that the road roller machine may be accurately controlled.

Embodiment 5

Figure 5:
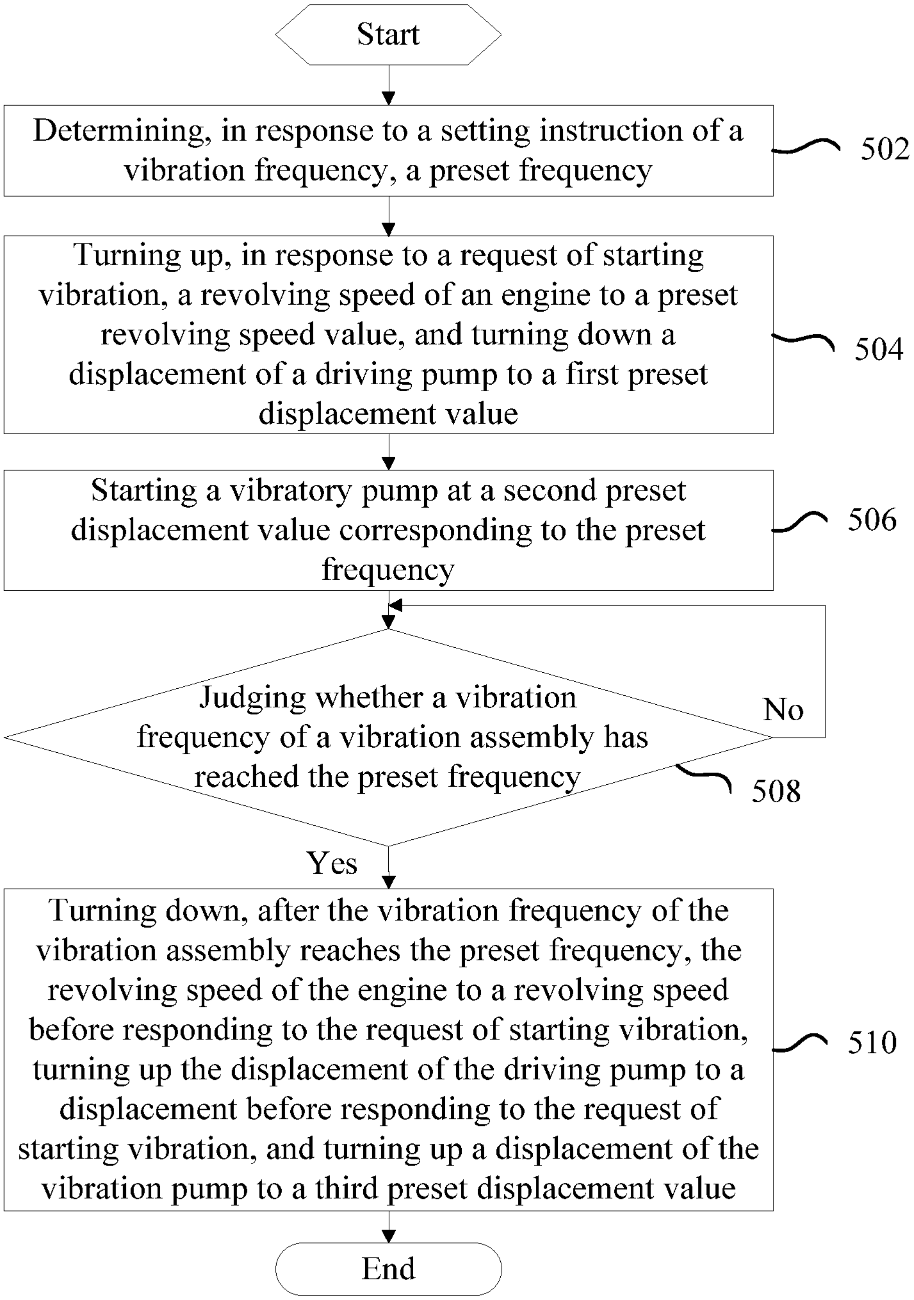
FIG. 5 is a flowchart of a control method for a road roller machine according to a fifth embodiment of the present application.

FIG. 5 is a flowchart of a control method for a road roller machine according to a fifth embodiment of the present application.

As shown in FIG. 5, a specific process of the control method for the road roller machine according to the fifth embodiment of the present application is as follows.

Step 502: determining, in response to a setting instruction of a vibration frequency, a preset frequency.

Step 504: turning up, in response to a request of starting vibration, a revolving speed of an engine to a preset revolving speed value, and turning down a displacement of a driving pump to a first preset displacement value.

Step 506: starting a vibration pump at a second preset displacement value corresponding to the preset frequency.

Step 508: judging whether a vibration frequency of a vibration assembly has reached the preset frequency. If a judgment result is yes, execute Step 510, and if the judgement result is no, return to Step 508 again.

Step 510: turning down, after the vibration frequency of the vibration assembly reaches the preset frequency, the revolving speed of the engine to a revolving speed before responding to the request of starting vibration, turning up the displacement of the driving pump to a displacement before responding to the request of starting vibration, and turning up a displacement of the vibration pump to a third preset displacement value.

The preset revolving speed value is higher than an upper limit of an economic revolving speed range.

In the embodiment, based on any one of Embodiments 1 to 4, as for a road roller machine with adjustable vibration frequency, the setting instruction of the vibration frequency is received firstly, and the vibration frequency is determined according to the setting instruction of the vibration frequency. The setting instruction of the vibration frequency may be a default instruction. For example, the vibration frequency of last execution is executed, or a system may set a same vibration frequency for each startup.

In an embodiment of the present application, the setting instruction of the vibration frequency may also be input this time.

Furthermore, according to the determined vibration frequency, the displacement of the vibration pump is adjusted to provide sufficient power for the vibration assembly.

Embodiment 6

Based on any one of Embodiments 3 to 5, a method for determining a first preset displacement value includes: detecting a driving speed of the road roller machine, determining a first corresponding relationship between a revolving speed of an engine and a displacement of a driving pump according to the driving speed of the road roller machine, and determining the first preset displacement value according to a preset revolving speed value and the first corresponding relationship.

In the embodiment, firstly the driving speed of the road roller machine is obtained, and the corresponding relationship between the revolving speed of the engine and the displacement of the driving pump at the driving speed is established, and when the revolving speed of the engine reaches the preset revolving speed value, the displacement of the driving pump is also adjusted to the first preset displacement value corresponding to the preset revolving speed value. Therefore, the driving speed of the road roller machine is ensured to be constant during a whole process of starting vibration.

Embodiment 7

Based on any one of Embodiments 3 to 6, the starting the vibration pump includes: determining a second corresponding relationship between a revolving speed of an engine and a displacement of a vibration pump according to a preset frequency, and determining a second preset displacement value according to the preset revolving speed value and the second corresponding relationship. The vibration pump is started at the second preset displacement value.

In the embodiment, firstly the second corresponding relationship between the revolving speed of the engine and the displacement of the vibration pump is established according to the preset frequency. After the revolving speed of the engine reaches the preset revolving speed value, the vibration pump is started at the second preset displacement value corresponding to the preset revolving speed value at the preset frequency, thereby providing sufficient power for starting vibration and ensuring a speed of starting vibration.

Embodiment 8

In a control method for a road roller machine according to an embodiment of the present application, in an economy mode of the road roller machine, a revolving speed of an engine is set in a low fuel consumption range. When a vibration start is started, the revolving speed of the engine is configured to rise to a preset revolving speed, and at the same time, a displacement of a driving pump is controlled to decrease to keep a driving speed of the road roller machine constant. After the revolving speed of the engine has risen to the preset revolving speed, a vibration assembly starts to vibrate to a preset frequency value of vibration.

After the vibration start is completed, the revolving speed of the engine is reduced to a revolving speed in the economic mode, at the same time, the displacement of the driving pump is controlled to turn up, and a displacement of a vibration pump is turned up, so that the driving speed and a frequency are constant.

Embodiment 9

According to an embodiment of a second aspect of the present application, a road roller machine provided by the present application includes: a main body, and an engine, a driving pump, a driving assembly, a vibration pump, a vibration assembly and a controller disposed on the main body. The controller is electrically connected with the engine, the driving pump and the vibration pump. The controller is configured to execute a control method for a road roller machine according to any one of the embodiments mentioned above.

The road roller machine provided by the embodiment of the present application includes: the main body, the engine, the driving assembly, the driving pump, the vibration assembly and the vibration pump. The engine is configured to provide power for the driving pump and the vibration pump. The driving pump is configured to drive the driving assembly, so as to drive the road roller machine to travel. The vibration pump is configured to drive the vibration assembly. The controller is configured to execute the control method for the road roller machine according to any one of the embodiments mentioned above. Therefore, the road roller machine provided by the present application has beneficial effects of the control method for the road roller machine provided by any one of the above embodiments, which will not be described one by one here.

Specifically, the road roller machine may be a road roller, and the vibration assembly includes a vibration wheel.

Embodiment 10

Based on Embodiment 9, a road roller machine further includes: a frequency detection assembly configured to detect a vibration frequency of a vibration assembly, disposed on a main body and electrically connected with a controller; and a speed detection assembly disposed on the main body. The speed detection assembly is configured to detect a speed of the road roller machine, and the speed detection assembly is electrically connected with the controller.

In the embodiment, the road roller machine further includes the frequency detection assembly. The frequency detection assembly is configured to detect the vibration frequency of the vibration assembly, so as to determine whether the vibration assembly has completed a vibration start through the vibration frequency. The road roller machine further includes the speed detection assembly. The speed detection assembly is configured to detect a driving speed of the road roller machine, so as to control a displacement of a driving pump according to the driving speed of the road roller machine and a revolving speed of an engine, thereby ensuring the constant driving speed of the road roller machine.

In the embodiments of the present application, terms such as "install", "connected", "connection" and "fix" may be understood in a broad sense. For example, the term of "connection" may be one of a fixed connection, a detachable connection and an integral connection. The term of "connected" may be directly connected or indirectly connected through an intermediary. As for those skilled in the art, specific meanings of the above terms in the present application may be understood according to specific situations.

In this specification, description of the terms such as "one embodiment", "some embodiments" and "specific embodiment" means that a particular feature, a structure, material or characteristic described in connection with the embodiments or examples is included in at least one embodiment or example of the present application. In this specification, schematic representations of the above terms do not necessarily refer to a same embodiment or example. Furthermore, the described particular features, structures, materials or characteristics may be combined in any suitable manner in any one or more embodiments or examples.

The above embodiments are only the preferred embodiments of the present application, and are not intended to limit the present application. For those skilled in the art, the present application may have various modifications and changes. Any modification, equivalent replacement, improvement, etc. made within the spirit and principles of the present application may be included in the scope of protection of the present application.

What is claimed is:

1. A control method for a road roller machine, wherein the road roller machine comprises an engine, a driving pump, a vibration pump and a vibration assembly, the driving pump and the vibration pump are powered by the engine, the vibration pump is connected with the vibration assembly, and the control method comprises:

before starting the vibration pump, turning up, in response to a request of starting vibration, a revolving speed of the engine until the revolving speed exceeds a preset revolving speed range and turning down a displacement of the driving pump;

starting the vibration pump;

judging whether the vibration assembly has completed a vibration start; and turning down, after the vibration assembly completes the vibration start, the revolving speed of the engine to be within the preset revolving speed range, turning up the displacement of the driving pump, and turning up a displacement of the vibration pump, wherein an adjustment amount of the revolving speed of the engine is inversely proportional to an adjustment amount of the displacement of the driving pump.

2. The control method for a road roller machine according to claim 1, wherein before the turning up, in response to a request of starting vibration, a revolving speed of the engine until the revolving speed exceeds a preset revolving speed range and turning down a displacement of the driving pump, the method further comprises:

controlling the revolving speed of the engine to be within the preset revolving speed range.

3. The control method for a road roller machine according to claim 2, wherein the turning up, in response to a request of starting vibration, a revolving speed of the engine until the revolving speed exceeds a preset revolving speed range and turning down a displacement of the driving pump comprises:

turning up, in response to the request of starting vibration, the revolving speed of the engine to a preset revolving speed value, and turning down the displacement of the driving pump to a first preset displacement value, so that a driving speed of the road roller machine is constant, wherein the preset revolving speed value is higher than an upper limit of the preset revolving speed range.

4. The control method for a road roller machine according to claim 3, further comprising:

detecting the driving speed of the road roller machine, determining a first corresponding relationship between the revolving speed of the engine and the displacement of the driving pump according to the driving speed of the road roller machine, and determining the first preset displacement value according to the preset revolving speed value and the first corresponding relationship.

5. The control method for a road roller machine according to claim 4, wherein the starting the vibration pump comprises:

determining a second corresponding relationship between the revolving speed of the engine and the displacement of the vibration pump according to a preset frequency, and determining a second preset displacement value according to the preset revolving speed value and the second corresponding relationship, so that the vibration pump is started at the second preset displacement value.

6. The control method for a road roller machine according to claim 1, wherein the judging whether the vibration assembly has completed a vibration start comprises:

judging whether a vibration frequency of the vibration assembly has reached a preset frequency, wherein when the vibration frequency of the vibration assembly reaches the preset frequency, the vibration assembly is deemed to have completed the vibration start.

7. The control method for a road roller machine according to claim 6, wherein the preset frequency comprises a vibration frequency of last execution, or a same vibration frequency set for each startup.

8. The control method for a road roller machine according to claim 6, wherein the judging whether a vibration frequency of the vibration assembly has reached a preset frequency comprises:

judging whether the vibration frequency of the vibration assembly continuously maintains the preset frequency within a preset time.

9. The control method for a road roller machine according to claim 8, wherein the preset time refers to 3 or 5 seconds.

10. The control method for a road roller machine according to claim 6, wherein before the turning up, in response to a request of starting vibration, a revolving speed of the engine until the revolving speed exceeds a preset revolving speed range and turning down a displacement of the driving pump, the method further comprises:

determining, in response to a setting instruction of the vibration frequency, the preset frequency.

11. The control method for a road roller machine according to claim 10, wherein the setting instruction comprises a default instruction.

12. The control method for a road roller machine according to claim 1, wherein the turning down, after the vibration assembly completes the vibration start, the revolving speed of the engine to be within the preset revolving speed range, turning up the displacement of the driving pump, and turning up a displacement of the vibration pump comprises:

turning down, after the vibration assembly completes the vibration start, the revolving speed of the engine to a revolving speed before responding to the request of starting vibration, turning up the displacement of the driving pump to a displacement before responding to the request of starting vibration, turning up the displacement of the vibration pump to a third preset displacement value, so that a driving speed of the road roller machine is constant and a vibration frequency of the vibration assembly is constant.

13. The control method for a road roller machine according to claim 1, wherein the preset revolving speed range comprises an economic revolving speed range of the road roller machine.

14. The control method for a road roller machine according to claim 13, wherein the economic revolving speed range of the road roller machine ranges from 1700 r/min to 1900 r/min, or 1300 r/min to 1500 r/min.

15. The control method for a road roller machine according to claim 1, wherein the road roller machine is a road roller, and the vibration assembly comprises a vibration wheel.

16. A road roller machine, comprising:

a main body;

an engine disposed on the main body;

a driving assembly disposed on the main body;

a driving pump disposed on the main body and configured to drive the driving assembly;

a vibration assembly disposed on the main body;

a vibration pump disposed on the main body and configured to drive the vibration assembly; and a controller electrically connected with the engine, the driving pump and the vibration pump, wherein the controller is configured to execute a control method for a road roller machine, and the control method comprises:

before starting the vibration pump, turning up, in response to a request of starting vibration, a revolving speed of the engine until the revolving speed exceeds a preset revolving speed range and turning down a displacement of the driving pump;

starting the vibration pump;

judging whether the vibration assembly has completed a vibration start; and turning down, after the vibration assembly completes the vibration start, the revolving speed of the engine to be within the preset revolving speed range, turning up the displacement of the driving pump, and turning up a displacement of the vibration pump, wherein an adjustment amount of the revolving speed of the engine is inversely proportional to an adjustment amount of the displacement of the driving pump.

17. The road roller machine according to claim 16, further comprising:

a frequency detection assembly disposed on the main body, wherein the frequency detection assembly is configured to detect a vibration frequency of the vibration assembly, and the frequency detection assembly is electrically connected with the controller; and a speed detection assembly disposed on the main body, wherein the speed detection assembly is configured to detect a speed of the road roller machine, and the speed detection assembly is electrically connected with the controller.

18. The road roller machine according to claim 16, wherein the road roller machine is a road roller, and the vibration assembly comprises a vibration wheel.

* * * * *